United States Patent [19]

Feldman et al.

[11] 3,819,265

[45] June 25, 1974

[54] SCANNING PROJECTION PRINTER APPARATUS AND METHOD

[75] Inventors: Martin Feldman, Springfield; Michael Charles King, Chatham Twp., both of N.J.

[73] Assignee: Bell Telephone Laboratories, Incorporated, Murray Hill, Berkeley Heights, N.J.

[22] Filed: Aug. 2, 1972

[21] Appl. No.: 277,275

[52] U.S. Cl. .......................... 355/51, 355/66, 355/77

[51] Int. Cl. .......................... G03b

[58] Field of Search ............. 355/51, 52, 78, 87, 65, 355/66, 77

[56] References Cited

UNITED STATES PATENTS

| | | | |
|---|---|---|---|
| 2,830,491 | 4/1958 | Domeshek | 355/52 X |
| 3,220,331 | 11/1965 | Evans et al. | 355/78 |
| 3,490,846 | 1/1970 | Kasper | 355/78 |
| 3,606,535 | 9/1971 | Koizumi | 355/66 |
| 3,619,056 | 11/1971 | Kantusch et al. | 355/87 X |

*Primary Examiner*—Richard M. Sheer
*Assistant Examiner*—Richard A. Wintercorn
*Attorney, Agent, or Firm*—R. B. Anderson

[57] ABSTRACT

In photolithographic projection apparatus used in semiconductor fabrication, the mask and semiconductor substrate are mounted on a common movable translation table. A small portion of the mask is imaged on the substrate by a high resolution, small image field optical system. The translation table is then moved in *x* and *y* directions to give raster scanning of the substrate by the projected mask image.

27 Claims, 11 Drawing Figures

SCANNING PROJECTION PRINTER APPARATUS AND METHOD

BACKGROUND OF THE INVENTION

This invention relates to photolithographic apparatus and methods, and more particularly, to projection printing apparatus used in semiconductor fabrication.

In the fabrication of semiconductor devices by photolithographic techniques, a semiconductor wafer is coated with a photosensitive film referred to as photoresist, and exposed to actinic light projected through a mask. Development and etching of the selectively exposed photoresist defines a pattern on the wafer surface which may be used for establishing diffusion areas, conductor patterns, and the like. Modern integrated circuit fabrication requires several such printing steps to be performed successively, with each mask exposure being in precisely controlled registration with previously formed patterns.

The two generally accepted masking techniques are known as contact printing, in which the mask is in contact or in extremely close proximity to the photoresist layer, and projection printing, in which the mask is imaged onto the photoresist. Projection printing offers the advantage that the mask is out of contact with the photoresist, thereby avoiding the hazard of accidental abrasion of the photoresist coating or the mask. A disadvantage is that, generally speaking, increases in the resolution of the image lens are accompanied by reductions of the image field; that is, reductions in the mask area that can be imaged onto the wafer.

This compromise between resolution and image field may limit the applicability of projection printing to the fabrication of large scale integrated circuits (LSI) in which complex and extensive patterns having extremely small dimensions are defined on a single semiconductor wafer.

SUMMARY OF THE INVENTION

Accordingly, it is an object of this invention to provide projection printing apparatus which is capable of high resolution pattern definition of relatively large area patterns.

This and other objects of the invention are attained in an illustrative embodiment thereof in which a stationary light beam and a high resolution image lens is used to image only a portion of a mask onto a photoresist-coated semiconductor wafer. The wafer and mask are then simultaneously moved to give raster scanning of the wafer by continuously changing the imaged portion of the mask.

In accordance with one feature of the invention, the mask and wafer are mounted on a common translation table; thus, by moving the translation table in a raster scan fashion, one achieves successive imaging of different portions of the mask onto different portions of the wafer to give complete exposure of the entire substrate to the entire mask pattern. In order that the scanning of the substrate properly track the light beam scanning of the mask, two imaging lenses may be used so that the image inversion of one lens compensates for the image inversion of the other.

For maximum optical efficiency it is preferred that a field lens be included between the two imaging lenses. The image plane of the first imaging lens and the object plane of the second imaging lens are coincident and are included within the field lens. With the two imaging lenses and the field lens, it is normally necessary to use mirrors to provide a folded optical path from the mask to the substrate. As will become clear later, to provide proper tracking, it is then necessary that an odd number of mirrors be used, and in a preferred embodiment, three mirrors are used.

As indicated previously, it is important that the mask be properly registered with the wafer, and for this purpose one should use non-actinic light to illuminate the wafer and to image it onto the mask. The non-actinic light can conveniently be projected into the optical system by using, as one of the mirrors, a mirror that is partially transparent at the non-actinic light frequency. Light projected through the mirror then illuminates the wafer and images it onto the mask so that registration can be observed through an appropriate microscope.

After the scanning process, it is of course important that the photoresist coating has been exposed substantially uniformly by successive images which represent the entire mask configuration, and that no part of the mask pattern has been eliminated. To insure this, it is preferred that there be some overlap of successive image scans. However, with a uniform light intensity, the photoresist would tend to become overexposed in areas of overlap with respect to the areas of non-overlap. As will be explained later, it is therefore preferred that the projected light beam have a substantially triangular light intensity distribution and that half of each image scan overlap the preceding image scan. With this provision, the total exposures to image light at all locations on the substrate are substantially equal.

These and other objects, features and advantages of the invention will be better understood from a consideration of the following detailed description, taken in conjunction with the accompanying drawing.

DRAWING DESCRIPTION

DETAILED DESCRIPTION

Figure 1:
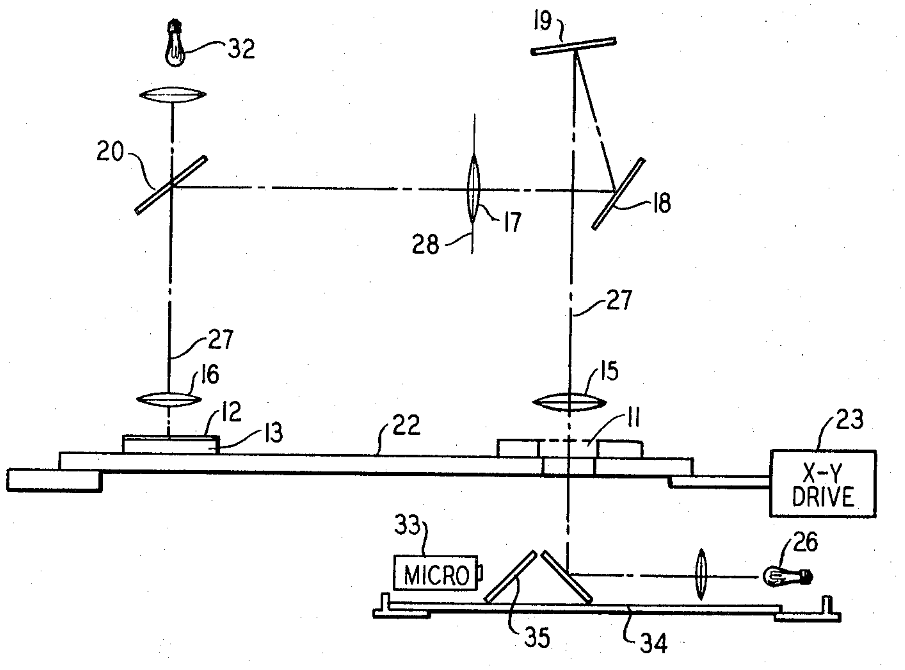
FIG. 1 is a schematic view of a scanning projection printer in accordance with an illustrative embodiment of the invention.

Referring now to FIG. 1, there is shown, as an illustrative embodiment of the invention, apparatus for projecting an image of a mask 11 onto a photoresist coating 12 overlying a semiconductor wafer 13. The projection apparatus comprises first and second imaging lenses 15 and 16, a field lens 17, and mirrors 18, 19 and 20. The mask and wafer are mounted on a common translation table 22 which is designed to be movable in a raster scan fashion by a drive mechanism 23. For example, mechanism 23 may drive the table 22 first in a positive $x$ direction, then move it abruptly in a negative $y$ direction, then drive it in a negative $x$ direction, move it abruptly in a negative $y$ direction and repeat the foregoing process. The resulting typical path traced by a point on the table is shown by curve 25 of FIG. 2.

The photoresist 12 is exposed to an image of the mask 11 by projecting actinic light from a source 26 through the mask along optical path 27 to the wafer 13. Lens 15 images the mask onto an image plane 28 within field lens 17, while lens 16 images the image plane 28 onto the photoresist coating 12. The purpose of the field lens, in conjunction with the two imaging lenses, is to increase the efficiency of light projection onto the photoresist coating, and to increase the field of view; for a more thorough discussion of this function, see, for example, "Applied Optics: A Guide to Modern Optical System Design," by Leo Levi, John Wiley & Sons, Inc., 1968, page 459. As will be explained later, the use of an even number of image lenses is necessary, in the embodiment shown, for compensating for the effects of image inversion.

Figure 2:
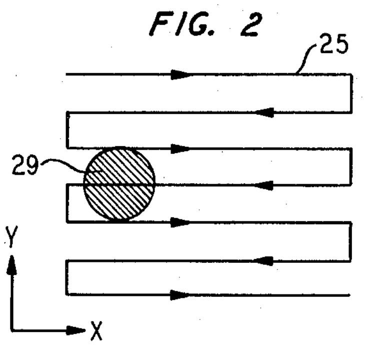
FIG. 2 is a diagram of the scanning path of the printer of FIG. 1.

As mentioned before, a high resolution of any imaging lens is ordinarily obtained only at the expense of the image field. In accordance with the invention, imaging lenses 15 and 16 are of extremely high resolution, and therefore have a smaller image field area than the area of mask 11. Thus, at any given time, only a small portion of mask 11 is imaged onto coating 12. This is illustrated in FIG. 2 which shows only one image portion 29 being projected at a given time. However, the scan of table 22, as shown by the path 25, is designed such that at the completion of the scan, all portions of mask 11 have been imaged onto the coating 12. Thus, at the completion of the scanning operation the total area of the mask 11 has been imaged onto the photoresist coating 12 by the successive imaging of different mask portions.

To accomplish the objectives of the invention, it is of course necessary that the image field be related to the raster scanning pattern such that the light beam from source 26 may be projected through all portions of the mask 11, and that all such portions be imaged onto the wafer 13. Since the mask and wafer are mechanically rigidly coupled, it is important that the scanning image on coating 12 track the scanning light beam on mask 11. Thus, an even number of imaging lenses may be used since a single imaging lens inherently inverts the image orientation with respect to that of the object and a second imaging lens may be used to compensate for such inversion.

Figure 3:
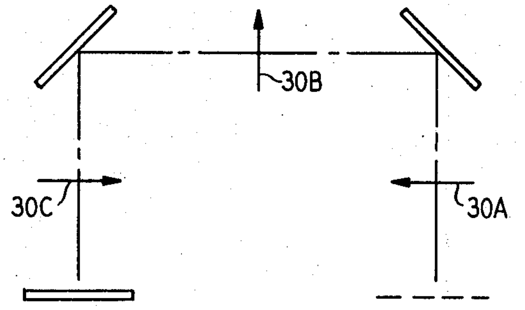
FIG. 3 is a schematic illustration showing the effects of mirror reflection on feature orientation.

Less apparent is the fact that an odd number of mirrors should be used if the optical path is to be folded by reflection. This requirement can be appreciated from FIG. 3 which illustrates the consequences of using an even number of mirrors. If an image projected from the mask has an orientation as shown by arrow 30A, it will have the orientation shown by arrow 30B after its first reflection, and an orientation shown by an arrow 30C after its second reflection. Thus, if only two mirrors were used, the orientation of the image on the wafer would have an opposite direction from that of the object on the mask, and scanning, through movement of the mask and wafer in identical directions, would give a blurred image. The same problem occurs whenever an even number of mirrors are used, whereas an odd number of mirrors give image orientation in the same direction as the object. Thus, it is preferred that three mirrors, such as mirrors 18, 19 and 20 of FIG. 1, be used. Of course, various other combinations of lenses and mirrors can give the required image orientation.

Another advantage of the optical system shown in FIG. 1 is that it is convenient for registering the mask with respect to the wafer through wafer illumination with non-actinic light. Mirror 20 may advantageously be a dichroic mirror which is reflective of actinic light but is partially transparent to non-actinic light. Thus, it is an efficient reflector of light originating at source 26, but it also provides a convenient technique for introducing non-actinic light from source 32 into the optical system during the registration step.

Light source 26 and microscope 33 are advantageously mounted on a common movable table 34 which is adjusted prior to registration such that mirror 35 intercepts the optical path 27. The wafer 13 is then illuminated by non-actinic light from source 32, and any pattern on the wafer is imaged by lenses 16 and 15 onto mask 11. With the wafer image and mask being observed through a microscope 33, the mask 11 may be oriented to register it properly with the wafer. After registration, source 26 is moved back to the position shown in FIG. 1, and the scanning operation is repeated to image the new mask onto the wafer.

Consider next the scanning pattern needed for substantially uniform exposure of the photoresist coating 12. If the image portion 29 of FIG. 2 had a rectangular configuration, if the raster scan path were that shown in FIG. 2, and if there were no overlap of the images of successive scan lines, the light intensity distribution could be uniform to give a uniform exposure of the photoresist. It can easily be seen, however, that it would be very difficult to give complete scanning of the entire mask with no overlap and yet no discontinuities of the total image represented by the scan. Thus, to insure imaging of all features of the mask, it is preferable that the images of successive scans overlap.

To prevent non-uniform exposure due to overlapping, the unmodulated light projected onto the photoresist coating may have a triangular light intensity distribution. With a 50 per cent overlap of successive image scans, the total light intensity distribution on the photoresist coating will have a characteristic of the type shown in FIG. 4, which is a plot of light intensity versus distance taken in a direction that corresponds to the $y$ direction of FIG. 2. Thus, the triangular light distribution of one scan line is designated by curve 37, the intensity distribution of the successive scan is shown by curve 38, the successive scan is shown by curve 39, etc. With the images of successive scans overlapping by 50 per cent, curve 38 overlaps curve 37 by 50 per cent. If each distribution has the same triangular form, and if the overlapping is 50 per cent as shown, it is easy to appreciate that the intensity summation at all distances $y$ are equal; that is, the intensity sum at any distance equals $E_0$.

Figure 5:
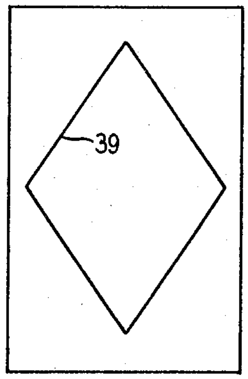
FIG. 5 is a schematic view of an aperture for giving a light distribution of the type shown in FIG. 4, and may be used in the printer of FIG. 1.
Figure 4:
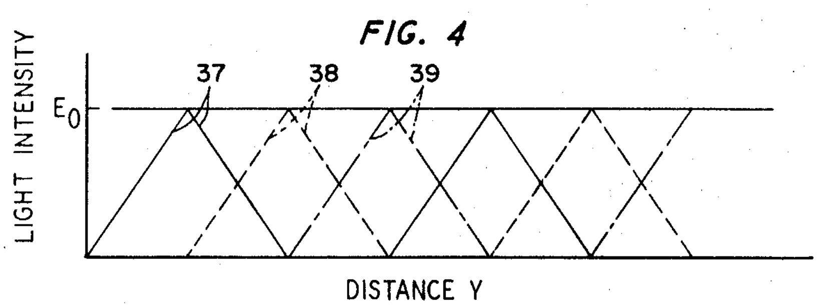
FIG. 4 is a graph of light intensity versus distance showing the effect of overlapping scanning.

The triangular distribution shown in FIG. 4 can be obtained by inserting into the light beam path a rectangular aperture 39 of the type shown in FIG. 5. More explicitly, such a rectangular aperture should be included at the image plane 28 of FIG. 1 to give a light intensity distribution that corresponds to the geometry of the aperture. Other light distributions may be used to give a uniform total distribution as described before, but the use of a rectangular aperture to give triangular distributions offers obvious advantages of simplicity. Further, the aperture configuration can be tailored to compensate for inherent intensity non-uniformities of source 26. A rigorous treatment of such considerations in achieving a uniform exposure is given in the Appendix.

In view of the foregoing, it can be appreciated that the imaging of a relatively large area mask onto a large area wafer can be accomplished in a manner consistent with the use of extremely high resolution lenses having correspondingly small image fields. Using lenses with smaller image fields makes possible other optical performance advantages such as low distortion. Finally through the use of an appropriate aperture or "field stop" in the field lens, more uniform photoresist exposure can be obtained.

Figure 6:
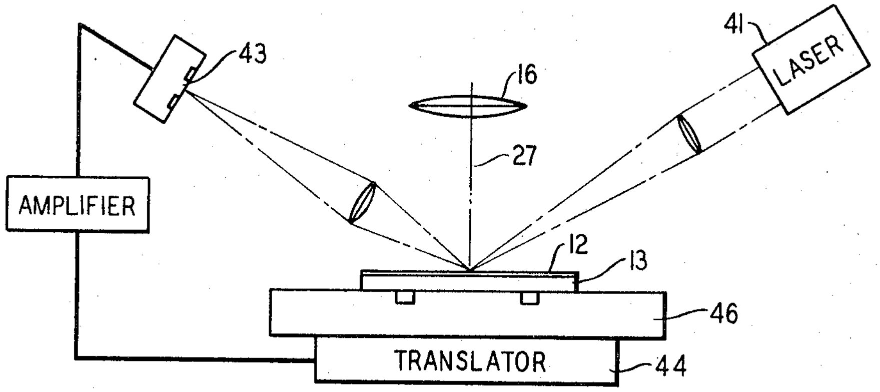
FIG. 6 is a schematic diagram of a positioning servomechanism that may be used in the printer of FIG. 1.

In view of the typically limited depth of field of high resolution lenses, it may be advisable to use a servomechanism of the type shown in FIG. 6 for maintaining the photoresist coating 12 in the image plane of lens 16 during the scanning operation. A non-actinic light beam from a laser 41 is focused at grazing incidence upon the surface of the photoresist coating. The light beam "waist" formed on the photoresist surface is imaged by a lens 42 onto a split photodiode 43. The position of the imaged light on the photodiode depends on wafer height and different signals are generated in a known manner depending on whether the impingement is above or below a reference location on the split photodiode. The signal generated is amplified and directed to a piezoelectric translator 44 which expands or contracts in a vertical dimension in response to the applied signal, thus adjusting the wafer surface to the proper height in response to any generated signal. The wafer 12 is preferably mechanically secured to the translator by a vacuum chuck 46.

Consider next the design details of the illustrative embodiment described thus far. In the design of the apparatus of FIG. 1 to form complex integrated circuit patterns, sophisticated mechanical techniques must be used to obtain the required scanning precision. By the use of known techniques, air bearings may be designed to support table 22 which are capable of scanning linearity to within 1 to 4 arc seconds with a repeatability of ±0.05 micrometers over a 4-inch span. If desired, several air bearings connected by a common work surface in each direction, spaced about 12 inches apart, may further reduce positioning errors. The table may typically be scanned in the $x$ direction at 5 centimeters per second, while the $y$ motion may be scanned steps of 4 millimeters. Each of these motions may employ stepping motors with appropriate linear motion conversions for driving air bearing slides. Known control systems may be employed for providing automatic position correction.

The lenses 15 and 16 may both be multielement 1/10 X lenses. The field lens 17 may likewise be a multielement lens to provide for the insertion of a field step as described before. The actinic light may have a predominant wavelength of 0.407 micrometers. The non-actinic light from source 32 may be predominantly at 0.546 micrometers, and an insertable lens or "flip lens" may be used to compensate for wavelength differences as described generally in the patent of K. M. Poole, U.S. Pat. No. 3,528,252, assigned to Bell Telephone Laboratories, Incorporated.

For the focus tracking of FIG. 6, laser 41 may be a helium-neon laser emitting non-actinic light at 6328 angstroms. With a 1.5 millimeter collimated laser beam focused by a 25 millimeter focal length cylindrical lens, and with a 10X imaging lens, the split diode may be of a type that generates a 20 per cent signal change in response to a one micrometer displacement. Piezoelectric translators are commercially available with a displacement range of 12 to 18 micrometers with a 10 pound axial load, and such devices would be suitable for translator 44. Other typical data and operating characteristics for scanning a wafer of approximately 50 millimeters in diameter is given by the following table:

TABLE I

Projection Printer Operating Characteristics

| | |
|---|---|
| Optical system characteristics: | |
| *f*/number | 1.5 |
| Maximum image field | 8 mm diameter |
| Magnification | 1× |
| Exposure Wavelength | 0.405 μm |
| Realignment Wavelength | 0.546 μm (with use of flip lens) |
| Distortion | less than 0.1 μm |
| Focal length | approximately 40 mm |
| Light source | 350 W mercury arc lamp |
| Illumination uniformity | 3% |
| Exposure uniformity | 1 % |
| Estimated exposure time on a 50 mm wafer | 20–30 seconds |
| Realignment accuracy | |
| using fiducial marks | ±0.5 μm |
| with automatic realignment | ±0.25 μm |
| Minimum working feature on silicon | 2.0 microns |
| Proposed wafer size | 50 mm diameter |
| Maximum wafer size | 100 mm diameter |
| Table velocity | 5±1% cm/sec. |
| Table scan step | 4±1% mm |
| Mask centerline to wafer centerline distance | 20 cm |

Certain techniques for controlling with great precision the movement of a translation table are discussed in the patent of D. R. Herriott et al. U.S. Pat. No. 3,573,849, assigned to Bell Telephone Laboratories, Incorporated, which principles may be applicable to certain embodiments of the present invention. The design of proper drive mechanisms to give the particular kind of raster scan described is well within the skill of a worker in the art.

It is to be understood that the particular characteristics and parameters that have been given are merely illustrative of one embodiment of the invention. For example, spherical reflectors, rather than lenses, may be used in a known manner to give the required imaging; this may be particularly advantageous for avoiding chromatic aberration and image inversion. Numerous departures from the specifications mentioned may be made, and numerous other embodiments and modifications may be made by those skilled in the art without departing from the spirit and scope of the invention.

APPENDIX

CONDITION FOR UNIFORM ILLUMINATION

Figure 7:
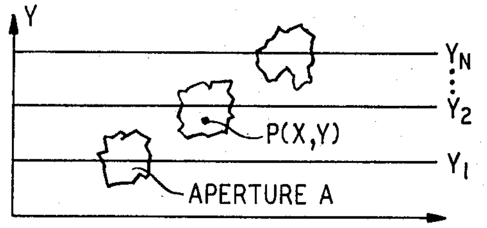
FIG. 7 is a diagram of a scanning path of a printer which illustrates certain general concepts of the invention.

Consider an image field A scanning along the X direction at constant velocity, as shown in FIG. 7. Assume the scan is repeated N times along the equal spaced axis $y1, y2, y3, \ldots, yn$. The fields may or may not overlap. We define the image field as the area covered by aperture A. The exposure field is the total area covered by the scanning of aperture A. In the following we derive the condition for uniform exposure at all points $p$ within the scanning field.

Definitions $I(x,y,)$: Intensity of illumination within the image field.

$A(x,y)$: Field Function = 1 inside image field.
Field Function = 0 outside image field.

In the scanning projection printer, $A(x,y)$ is the field stop inside the illumination system. The net exposure $E_1(y)$ at a point $p(x,y)$ resulting from the $i^{th}$ scan is $$E_1(y) = E_o \int I(x,y-y_i)A(x,y-y_i)dx \quad (1)$$

$$E_o = \text{constant}$$

The net exposure $E_t(y)$ at point $p(x,y)$ resulting from all N scans is $$E_T(y)=\sum_{i=1}^{N} E_i(y_i)=E_0\sum_{i=1}^{N}\int I(x,\ y-y_i)A(x,\ y-y_i)dx \quad (2)$$

A necessary and sufficient condition for uniform exposure field is $$dE_T(y)/dy = 0 \quad (3)$$

or $$\frac{d}{dy}\left[\sum_{i=1}^{N}\int I(x,\ y-y_i)A(x,\ y-y_i)dx\right]=0 \quad (4)$$

This means that in drawing exposure profiles of each scan, we require that the sum of the exposures equals a constant at all points $y$ inside the exposure field.

In the examples that follow we will make the assumption that the illumination is uniform in the exposure field. We can then make the simplification that $I(x,y)$ = constant $$\frac{d}{dy}\left[\sum_{1}^{N}\int A(x,\ y-y_i)dx\right]=\frac{d}{dy}\left[\sum_{i=1}^{N}W(y-y_i)\right]=0 \quad (5)$$

$W(y-y_i)$ is the width of the field function at a distance $y-y_i$ from the $i^{th}$ scan axis. So for constant image field illumination, the condition for constant exposure in the exposure field is $$\frac{d}{dy}\left[\sum_{i=1}^{N}W(y-y_i)\right]=0 \quad (6)$$

Case 1

The scans do not overlap. There is only one term in the sum, so $$dW(y)/dy = 0 => W(y) = \text{constant}. \quad (7)$$

Figure 8:
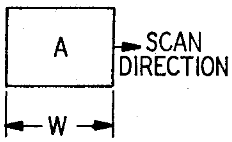
FIG. 8 is a diagram of an aperture which is presented as part of an explanation of certain inventive concepts.
Figure 9:
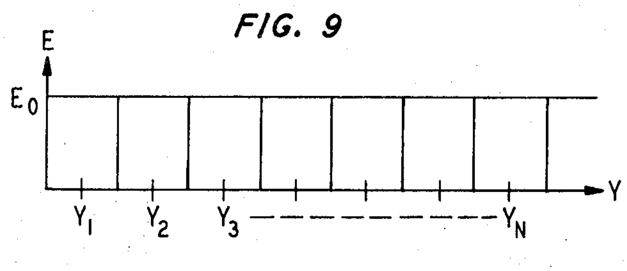
FIG. 9 is a light intensity profile which is presented as part of an explanation of certain inventive concepts.

The aperture that satisfies this condition is shown in FIG. 8. The intensity profile would be that shown in FIG. 9. As will be noted, this case allows no tolerance for errors in scan position. Any error of a scan, from its true scan axis, will cause a 100 per cent fluctuation in the exposure.

Case II

The scans overlap by 50 per cent. The condition on the aperture widths becomes $$d/dy[\ W_i\ (y-y_i) + W_{i+1}(y-y_{i+1})\ ] = 0 \quad (8)$$

Figure 10:
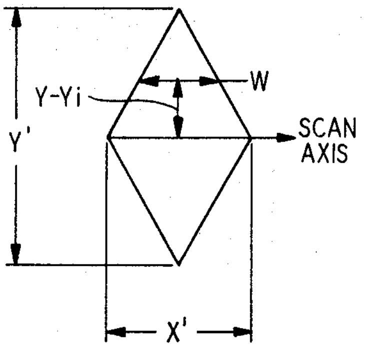
FIG. 10 is a diagram of overlapping scans which is presented as part of an explanation of certain inventive concepts.

One solution to this equation is the aperture function shown in FIG. 10.

Figure 11:
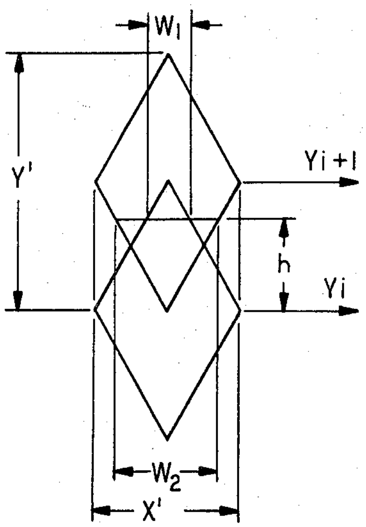
FIG. 11 is a diagram of overlapping scans which is presented as part of an explanation of certain inventive concepts.

From a drawing of overlapping scans we can derive the aperture widths as shown in FIG. 11. The exposure profile would then be that shown in FIG. 4. If the maximum aperture width is 8 mm, then the slope of each exposure profile is $I_o/4$ mm. So a positional error of 40 $\mu$m would cause a 1 per cent error in the exposure level.

In a more general case, when the illumination within the image field ($I(x,y)$) is not constant, uniform exposure illumination is achieved by solving integral Equation (4) for the field function A.

In the printer, it is preferred to incorporate a field stop similar to the aperture function discussed in Case II. To achieve uniform exposure, some modification of this field stop is envisioned to compensate for the 3 per cent variation in uniformity of illumination.

What is claimed is:

1. Photolithographic projection apparatus comprising:
- a mask;
- a photosensitive medium;
- means comprising an even number of inverting lenses for imaging a portion of the mask onto a portion of the photosensitive medium, the mask portion length and width both being small relative to the length and width of the entire mask;
- the inverting lenses having a relatively high resolution and a relatively small image field;
- and means comprising a support for the mask which is rigidly coupled to a support for the photosensitive medium for simultaneously moving the mask and the photosensitive medium in both length and width dimensions to cause substantially all portions of the mask to be imaged on different portions of the photosensitive medium.

2. The photolithographic projection apparatus of claim 1 wherein:
- the photosensitive medium is a photoresist film overlying a semiconductor wafer.

3. The photolithographic projection apparatus of claim 2 wherein:

the imaging means further comprises an odd number of mirrors for projecting light from the mask to the photosensitive medium.

4. The photolithographic projection apparatus of claim 3 further comprising:

a field lens;

and wherein the imaging means comprises a first inverting lens for imaging the mask onto an image plane within the field lens and a second inverting lens for imaging the image plane onto the photosensitive medium.

5. Photolithographic projection apparatus comprising:

a mask;

a photosensitive medium;

means for imaging a portion of the mask onto a portion of the photosensitive medium, the length and width of the portion both being small relative to the length and width of the entire mask;

means for simultaneously moving the mask and the photosensitive medium in both length and width dimensions to cause substantially all portions of the mask to be imaged on different portions of the photosensitive medium;

the moving means comprising means for causing the mask portion to raster scan the photosensitive medium.

6. The photolithographic projection apparatus of claim 5 wherein:

the imaging means comprises means for projecting a light beam having a non-uniform unmodulated intensity distribution, which is modulated by the mask image;

and the scanning means comprises means for causing the images of successive scans of the photosensitive medium to overlap.

7. The photolithographic projection apparatus of claim 6 wherein:

the summations of the incident unmodulated light intensities on all portions of the photosensitive medium scanned by the light beam are substantially equal.

8. The photolithographic projection apparatus of claim 7 wherein:

the non-uniform unmodulated light intensity distribution of the light beam has a substantially triangular characteristic.

9. The photolighographic projection apparatus of claim 8 further comprising:

means for establishing the triangular light intensity distribution comprising a rectangular aperture in the path of the light beam.

10. The photolithographic projection apparatus of claim 9 wherein:

the imaging means comprises an even number of inverting lenses;

and the moving means comprises a support for the mask which is rigidly coupled to a support for the photosensitive medium.

11. The photolithographic projection apparatus of claim 10 further comprising:

a field lens;

and wherein the imaging means comprises a first inverting lens for imaging the mask onto an image plane within the field lens and a second inverting lens for imaging the image plane onto the photosensitive medium.

12. The photolithographic projection apparatus of claim 11 wherein:

a rectangular aperture is defined within a plane that is substantially coincident with said image plane.

13. The photolithographic projection apparatus of claim 12 wherein:

the photosensitive medium is a photoresist film overlying a semiconductor wafer.

14. The photolithographic projection apparatus of claim 13 wherein:

the imaging means further comprises an odd number of mirrors for projecting light from the mask to the photosensitive medium.

15. Photolithographic projection apparatus comprising:

a mask;

a photosensitive medium supported by a piezoelectric element; means for imaging a portion of the mask onto a portion of the photosensitive medium, the length and width of the portion both being small relative to the length and width of the entire mask;

means for simultaneously moving the mask and the photosensitive medium in both length and width dimensions to cause substantially all portions of the mask to be imaged on different portions of the photosensitive medium;

means for directing a light beam such that it is reflected from the surface of the photosensitive medium at an acute grazing angle;

means intercepting the reflected light beam for generating an electrical control signal in response to the beam position;

and means for directing the control signal to the piezoelectric element;

said piezoelectric element comprising means for controlling the physical position of the photosensitive medium in response to the control signal.

16. The photolithographic projection apparatus of claim 15 wherein:

the control signal generating means comprises a split photodiode.

17. Photolithographic projection apparatus comprising:

a mask;

a photosensitive medium covering a semiconductor wafer surface;

a source of actinic light;

means for illuminating the mask with the actinic light and projecting the light along a folded optic path defined by an odd number of mirrors;

means included in the optic path for imaging a portion of the mask onto a portion of the wafer surface when the mask is illuminated and for imaging a portion of the wafer surface onto the mask when the wafer is illuminated;

means for simultaneously moving the mask and semiconductor wafer to cause different portions of the mask to be imaged on different portions of the wafer surface;

a non-actinic light source;

means for selectively illuminating the wafer surface with non-actinic light, whereby the wafer surface is selectively imaged onto the mask surface;

and means comprising a microscope for observing the wafer surface superimposed on the mask, thereby to assist in the registration of the mask with respect to any patterns that may be included on the wafer surface.

18. The photolithographic projection apparatus of claim 17 wherein:

one of said mirrors is a dichroic mirror which is reflective of light from said actinic light source but partially transparent to light of the non-actinic light source;

said dichroic mirror being included between the non-actinic light source and the wafer surface, whereby non-actinic light is transmitted through the dichroic mirror before illumination of the wafer, thus facilitating projection of non-actinic light along said optic path.

19. The photolithographic projection apparatus of claim 18 wherein:

the imaging means comprises an even number of inverting lenses;

and the moving means comprises a translational table for supporting both the mask and the semiconductor wafer.

20. The photolithographic projection apparatus of claim 19 wherein said lenses and mirrors are included on one side of said translational table, and said microscope and actinic light source are located on the other side of the translational table;

and means for alternately moving either said actinic light source or said microscope into said optic path to facilitate mask registration and subsequent light exposure of the wafer.

21. The method of projection printing a relatively large area pattern onto a photosensitive medium through the use of a relatively high resolution, small image field optical system comprising the steps of:

supporting the pattern and the photosensitive medium on a common translation structure;

using an even number of lenses to image a minor portion of the pattern onto the photosensitive medium with said high resolution, small image field optical system;

directing a light beam onto a minor portion of the mask;

and moving the translation structure such as to cause all portions of the mask to intercept the light beam path thereby to cause all portions of the pattern to be imaged onto the photosensitive medium.

22. The method of claim 21 wherein:

the step of moving the translation structure comprises the step of moving the translation structure in a raster scan fashion.

23. The method of claim 22 further comprising the step of reflecting light projected from the mask an odd number of times prior to its impingement on the photosensitive medium.

24. The method of claim 23 further comprising the step of:

modifying the light projected from the mask such as to produce a substantially triangular light intensity distribution of said projected light;

and moving the translation table such as to cause the images of successive scans to overlap to approximately 50 per cent.

25. The method of claim 24 wherein the modifying step comprises the step of projecting said light through a rectangular aperture.

26. Photolithographic projection apparatus comprising:

a mask;

a photosensitive medium;

means for imaging a portion of the mask onto a portion of the photosensitive medium, the length and width of the mask portion both being small relative to the length and width of the entire mask;

means comprising a support for the mask which is rigidly coupled to a support for the photosensitive medium for simultaneously moving the mask and the photosensitive medium in both length and width directions to cause substantially all portions of the mask to be imaged on different portions of the photosensitive medium;

the imaging means including a plurality of mirrors and image inverting means which together comprise means for forming an image portion having the same relative orientation with respect to the movement of the rigidly coupled supports as does the corresponding mask portion.

27. The method of projection printing a relatively large area pattern onto a photosensitive medium through the use of a relatively high resolution, small image field optical system comprising the steps of:

imaging a minor portion of the pattern onto the photosensitive medium with said high resolution, small image field optical system;

rigidly cojpling the pattern and the photosensitive medium;

moving the coupled pattern and photosensitive medium in length and width directions to cause different portions of the mask to be imaged on different portions of the photosensitive medium;

and the imaging step comprises the step of using a plurality of mirrors and image inverting means to form an image portion having the same relative orientation with respect to the movement of the coupled pattern and photosensitive medium as does the corresponding mask portion.

* * * * *